L. M. CRANE.
PAPER FABRIC.
No. 66,302. Patented July 2, 1867.
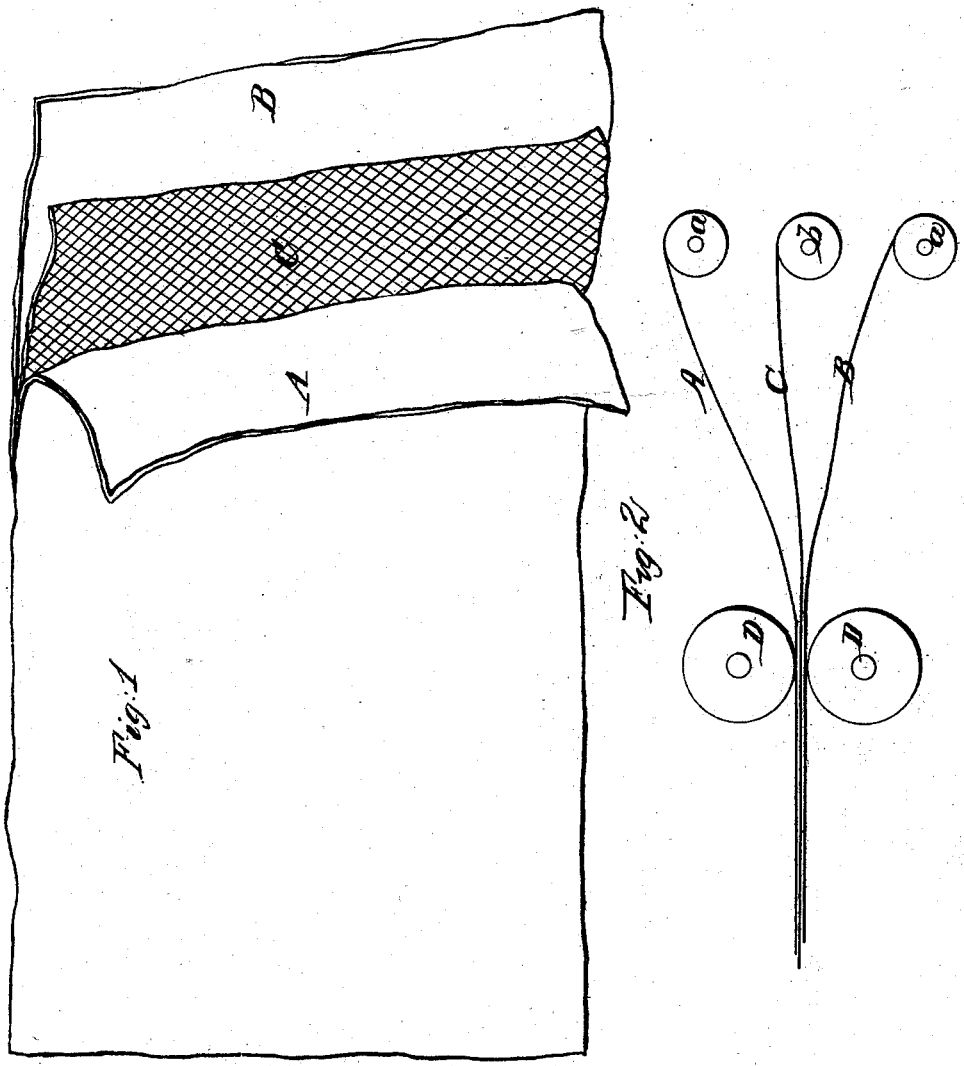
Witnesses:
Alex F. Roberts.
E. L. Topliff.
Inventor:
L. M. Crane
per Munn & Co
Attorneys

United States Patent Office.

L. M. CRANE, OF BALLSTON SPA, NEW YORK.

Letters Patent No. 66,302, dated July 2, 1867.

---

IMPROVED WATER-PROOF PAPER FABRIC.

---

*The Schedule referred to in these Letters Patent and making part of the same.*

---

TO ALL WHOM IT MAY CONCERN:

Be it known that I, L. M. CRANE, of Ballston Spa, in the county of Saratoga, State of New York, have invented a new and improved Water-Proof Paper Fabric; and I do hereby declare that the following is a full, clear, and exact description thereof, which will enable others skilled in the art to make and use the same, reference being had to the accompanying drawings forming a part of this specification, in which—

Figure 1 is a view of a piece of my improved fabric, with the layers or sheets detached or separated at one end for the purpose of showing the construction.

Figure 2, a diagram designed to show the mode of manufacturing the same.

Similar letters of reference indicate like parts.

This invention relates to a new and improved water-proof paper fabric, especially useful for the manufacture of collars, bosoms, cuffs, shirts, vests, garments, covers, wrappers, and other useful purposes.

The invention consists in constructing the fabric of two or more layers of paper with a layer or sheet or sheets of gutta percha or rubber, or other water-proof material, interposed and conducted between the sheets of paper, substantially as hereinafter fully shown and described.

The layers of paper, A B, are manufactured in the usual manner, and of any desired quality and thickness, according to the use for which the fabric is designed. The layer or sheet of gutta percha, C, or rubber, is interposed between the layers of paper A B, and by heat and pressure the layers of paper and the gutta percha or rubber are firmly cemented together. My mode of manufacture will be clearly understood by referring to fig. 2. The layers of paper, A B, are wound upon rollers or shafts, $a\ a$, placed one above the other at a suitable distance apart. The layer of gutta percha or rubber, C, is wound upon a roller or shaft, $b$, placed between the rollers or shafts $a\ a$, and the three layers, A B C, pass between heated rollers, D D, which cause the layers to be firmly cemented together, the gutta percha or rubber, when heated, being sufficiently adhesive to cause the layers of paper and water-proof material to unite under pressure and become securely attached. The gutta percha or rubber layer, C, renders the fabric impervious to water, and materially strengthens it. The two layers of paper, A B, may be of different quality, the outer layer, A, being superior to the inner one, B. This would of course reduce the cost of manufacture, and, in certain cases, where the inner layer is not seen, or is not exposed in the use of the article manufactured from the fabric, will answer equally as well as if both layers of paper were of superior quality.

My improvement not only renders the paper water-proof, but also makes it stronger and stiffer, so that when my improved fabric is used for the manufacture of collars, cuffs, bosoms, and other articles of wear to be worn next to the skin, it prevents the perspiration and moisture from passing through the fabric, and the outside is thus protected from soiling. Collars made of my improved fabric are also stiffer than other paper collars, and will not so easily break down when worn. The superior strength of my improved fabric prevents it from breaking when button-holes are made in it, and thus facilitates its use for various kinds of light garments.

Having thus described my invention, I claim as new, and desire to secure by Letters Patent, as an improved article of manufacture—

A water-proof paper fabric made substantially as herein shown and described.

The above specification of my invention signed by me this    day of August, 1866.

L. M. CRANE.

Witnesses:
PETER COOKE,
J. A. ELLSWORTH.